United States Patent [19]
Pyron et al.

[11] Patent Number: 5,636,422
[45] Date of Patent: Jun. 10, 1997

[54] BAGHOUSE FILTER INSTALLATION MANIFOLD

[76] Inventors: Donald Pyron, 2315 Edgewood; Henry M. Pyron, 1904 W. Elm, both of El Dorado, Ark. 71730

[21] Appl. No.: 383,500

[22] Filed: Feb. 1, 1995

Related U.S. Application Data

[63] Continuation-in-part of Ser. No. 67,823, May 27, 1993, Pat. No. 5,398,386.

[51] Int. Cl.$^6$ ........................................... B23P 19/04
[52] U.S. Cl. ............................................ 29/235; 29/421.1
[58] Field of Search .......... 29/235, 252, 402.02–402.06, 29/402.08, 421.1, 452; 55/302, 341.1, 341.3, 372, 379, DIG. 26; 95/279, 280, 286

[56] References Cited

U.S. PATENT DOCUMENTS

| | | | |
|---|---|---|---|
| 4,073,632 | 2/1978 | Reinauer et al. | 55/374 |
| 4,113,449 | 9/1978 | Bundy | 55/302 X |
| 4,157,901 | 6/1979 | Schaltenbrand | 55/379 X |
| 4,194,894 | 3/1980 | Noland | 55/DIG. 26 X |
| 4,257,790 | 3/1981 | Bergquist et al. | 55/379 |
| 4,277,874 | 7/1981 | Brown et al. | 29/235 |
| 4,435,197 | 3/1984 | Nihawan et al. | 55/341.7 |
| 4,618,353 | 10/1986 | Reier | 29/452 X |
| 5,017,200 | 5/1991 | Price et al. | 29/402.08 X |

*Primary Examiner*—Peter Vo
*Attorney, Agent, or Firm*—Jerry L. Mahurin

[57] ABSTRACT

A baghouse filter bag installation system for installing new baghouse filter cartridge bags upon baghouse cages. The system comprises an elongated manifold adapted to coaxially receive a baghouse cage. The manifold comprises an elongated, generally cylindrical, hollow body, an open distal end and an open proximal end defining a flange. A compressor provides slightly pressurized high volume air to the proximal end of the manifold to inflate new bags fitted to the distal end of the manifold. Preferably the air supplied is warm. This softens the material of the bag making it more pliable, easing installation. A tuyere facilitates the fluid flow communication between the compressor and the manifold. The tuyere also makes it possible to employ a second manifold. The tuyere has at least one flange to mate with the manifold proximal end flange providing fluid flow communication between the compressor and at least one manifold. A cap is used to seal one of the tuyere flanges when not in use. A pliable seal disposed between the cap the tuyere flange facilitates sealing. Radially spaced apart orifices defined in the body of the manifold, adjacent the distal end, maintains inflation of the bags during installation.

10 Claims, 3 Drawing Sheets

BAGHOUSE FILTER INSTALLATION MANIFOLD

CROSS REFERENCE TO RELATED APPLICATION

This is a Continuation-in-Part of [allowed] U.S. Pat. application Ser. No. 08/067,823, Filing Date: May 27, 1993, entitled Process for Rejuvenating Baghouse Filter Cartridges (as amended), which issued as U.S. Pat. No. 5,398,386 on Mar. 21, 1995.

BACKGROUND OF THE INVENTION

The Prior Art

The present invention broadly relates to baghouse filtration systems. Specifically, the present invention is a Baghouse Filter Installation Manifold. Art pertinent to the subject matter of the present invention can be found in U.S. Patent Classes 29 and 55.

Baghouses are employed to filter particulates from air expelled by various commercial processes. Some processes employ baghouses to remove hazardous wastes before venting to the atmosphere. Other processes use baghouses to gather output product.

Most modern baghouses employ a stainless steel skeletal framework, commonly referred to as a cage, to support filter bags. Together the cage and bag form a cartridge. Various mounting systems are used to anchor these cartridges in baghouse structures. Generally speaking, the cartridges are mounted to a tube sheet which is a flat plate with a plurality of cartridge receptive orifices defined in it. The cartridges may be clamped in place. Alternatively, a series of indents or notches defined in a flange around the opening mate with grooves or ribs defined in a shroud on the open end of the cage to hold the cartridge in place. The tube sheet is mounted in the baghouse in such a manner that it separates the input gases from the output gases. Gases to be filtered pass though the bags in one direction or the other, collecting material on the outside or the inside of the bag.

Innumerable patents are directed to baghouse configurations. Birkholz, U.S. Pat. No. 1,821,202, discloses a renewable capsule filter which employs a baghouse structure having a mesh frame. More conventional, modern baghouses are disclosed in several U.S. Patents. Dobyns, U.S. Pat. No. 4,976,756, discloses a dust collector with a hinged roof to facilitate cleaning and use. Heffeman, U.S. Pat. No. 4,309,200, discloses a baghouse with a collapsible filter bag assembly.

Some U.S. Patents speak directly to filter structures and the connections employed to secure the cartridge to the tube sheet. De Martino, U.S. Pat. No. 4,256,473, discloses a cylindrical collar unit used to attach a bag frame to the permanent baghouse structure. Gravley, U.S. Pat. No. 3,937,621, discloses a filter bag cuff. It is basically a ring folded within the fabric of the bag and stitched into place. Reinauer, U.S. Pat. No. 4,073,632, discloses a structure for mounting bags. This structure uses a semirigid bag with an integral framework. This patent discloses two end caps, one which allows the entrance of air and the other which supports the distant end of the bag. Miller, U.S. Pat. No. 4,042,356, discloses a baghouse cell plate and filter bag attachment. Here a structure extends outward from the baghouse cell plate with a grove in it for accepting the upper lip of a filter bag. U.S. Pat. No. 4,424,070 issued to Robinson Jan. 3, 1984, discloses a dust collecting filter cartridge and attachment structure. The attachment structure is an adapter that uses a rubber clamp to mate dissimilarly sized cartridges and tube sheets.

Other patents speaking to baghouse filter structures include: Schaltenbrand, U.S. Pat. No. 4,157,901; Noland, U.S. Pat. No. 4,194,894; Bergquist, U.S. Pat. No. 4,257,790 Brown, U.S. Pat. No. 4,277,874 Nijhawan, U.S. Pat. No. 4,435,197; Reier, U.S. Pat. No. 4,618,353; Price, U.S. Pat. No. 5,017,200

U.S. Pat. No. 5,095,607 issued to Simon on Mar. 17, 1992, discloses a tool for securing baghouse filters. It employs a tapered head to expand the open end flange of a baghouse filter cartridge the to facilitate inserting it into the tube sheet or other framework.

Various means are employed to clear the material from the bags in the baghouse. For example, Bundy, U.S. Pat. No. 4,113,449 discloses a two step process. First, the pressure of the gases flowing through the bags is reduced. Next the bags are blasted with high pressure gas to dislodge collected particles. Another method uses vibration. However, over time the bags become so heavily clogged with material that they must be replaced.

The first step in replacing the bags is removal of the cages mounting the filtration bags from the baghouse. Once removed from the baghouse, the bags are stripped from the cages. Bent or damaged cages are discarded as scrap metal or repaired. Prior art methods call for new bags to be installed on the cages by hand. The most practical bag installation methods to date involve sliping the open end of the bag over the distal end of the cage and rucking the bag up and pulling it onto the cage. Hence, the greatest drawback to prior art baghouse retrofit processes is labor cost. The man-hours involved in manually fitting the cages with bags are significant. While the filter cartridges are removed, the baghouse will not be operational. In some circumstances this can result in downtime for a significant portion if not an entire plant.

Hence, it is desirous to provide an appuratus to facilitate installation of bags onto cages in a timely manner without damaging the cage. Thusly, reducing downtime as well as costs in general.

SUMMARY OF THE INVENTION

Our Baghouse Filter Installation Manifold is used to install new bags on the cages. It comprises an elongated tubular body. The distal end is open. The proximal end comprises a flange adapted to mate with a tuyere flange to provide airflow communication between an air compressor and the manifold. The compressor and tuyre are prefrferably mounted on a trailer. To facilitate use, a tuyere extension elbow can be employed to vary placement of the manifold relitive to the trailer. The prefered tuyere extension elbow comprises a closed end tubular body and two perpendicular flanges. One flange, the input flange, is adapted to couple with the tuyere flange. The perpendicularly oriented output flange is adapted to mate with the manifold flange, allowing the manifold to be positioned generally parallel to the trailer. The manifold is supported near the flange by a stand. A trough is disposed in alignment with the open end of the manifold to support the new bag to be installed.

As mentioned above the equipment used to retrofit the baghouse is preferably transported on and deployed in conjunction with a trailer. The trailer comprises several structures to accommodate and carry the equipment.

Therefore, a primary object of the present invention is to provide a baghouse filter installation manifold.

An object of the present invention is to provide a baghouse filter installation manifold which uses pressurized air to facilitate installation of baghouse filter bags on baghouse cages.

An object of the present invention is to provide a baghouse filter installation manifold which recduces the number of manhours necessary to install baghouse bags on baghouse cages.

An object of the present invention is to provide a baghouse filter installation manifold which uses warm air to soften bags for istalation on baghouse cages.

An object of the present invention is to provide a baghouse filter installation manifold which allows one to install new bags on baghouse cages without forcibly bending the cages.

An object of the present invention is to provide a baghouse filter installation manifold which allows one to install new bags on baghouse cages without forcibly manipulating the bag.

These and other objects and advantages of the present invention, along with features of novelty appurtenant thereto, will appear or become apparent in the course of the following descriptive sections.

DETAILED DESCRIPTION

Figure 1:
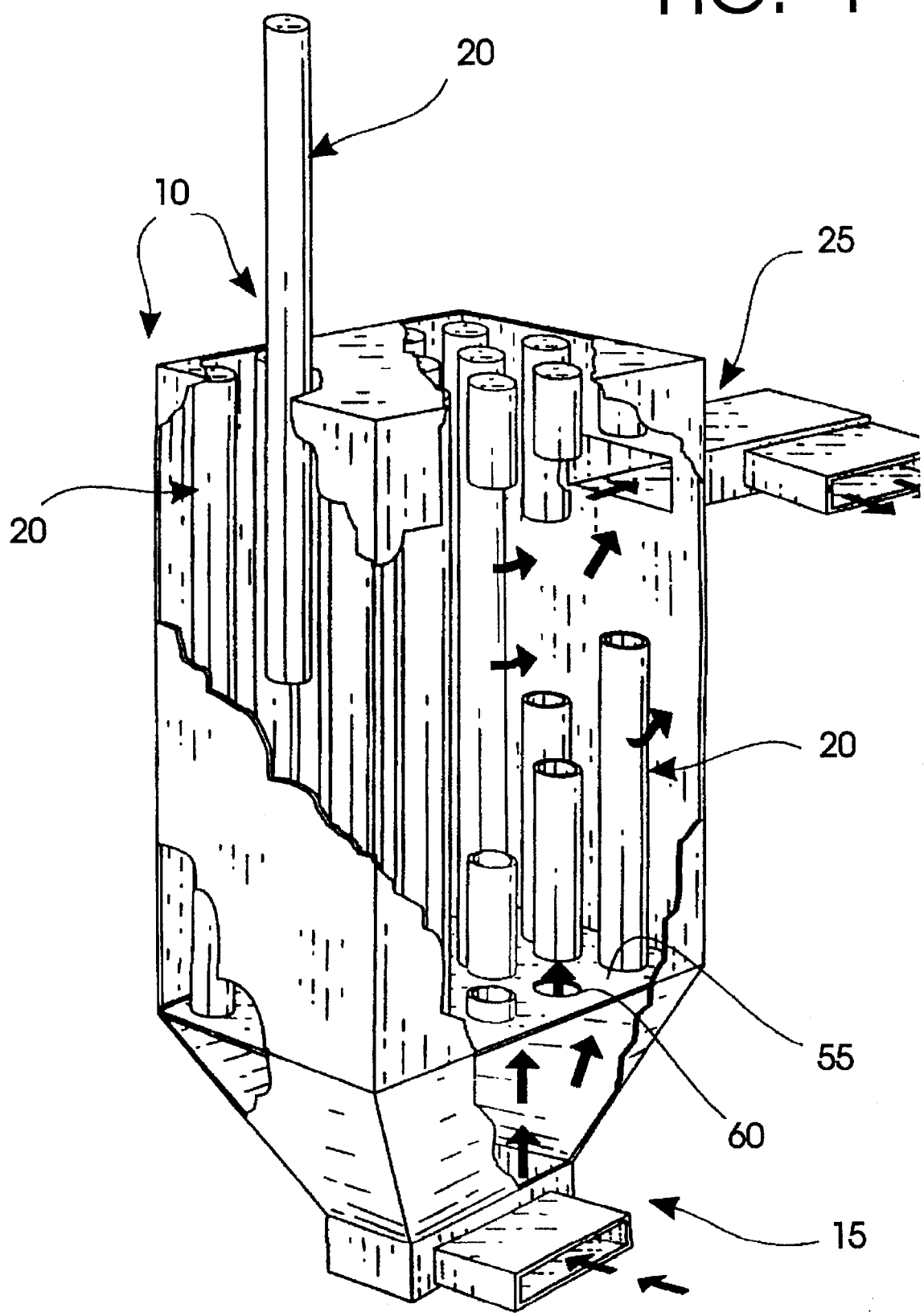
FIG. 1 is a diagramatical, fragmented, partially exploded isometric view of a typical baghouse illustrating removal of a baghouse cartridge.

With reference now to the accompanying drawings, A typical baghouse, broadly designated by the reference numeral 10, is illustrated in FIG. 1. It generally comprises an inlet plenum 15 in air flow communication, through an array of cartridges 20, with an outlet plenum 25. Each cartridge 20 is comprised of a generally tubular, skeletal cage 30 (FIGS. 2 and 3) with a semipermeable filter bag 35 disposed over it. The cages 30 are usually constructed from stainless steel and are comprised of elongated, round longitudinal spines 40 welded to generally circular hoops 45. Both the spines 40 and hoops 45 are constructed of relatively rigid stainless steel wire. One end of the cage 30 is usually capped by a circular plate 50. Various mounting systems are used to anchor cartridges 20 in baghouse structures 10. Generally speaking, the cages 30 are mounted to a tube sheet 55 (FIG. 1) which is a flat plate separating the inlet plenum 15 from the outlet plenum 25. The tube sheet 55 has a plurality of cage receptive orifices 60 defined in it. The cartridges 20 are usually either clamped in place or a series of indents in the tube sheet 55 mate with grooves defined in a shroud 70 on the cage 20 holding the cartridge 20 in place. The first step in retrofitting a baghouse 10 is to remove the cartridges 20 from the baghouse 10.

Once the bags 35 are striped from the cages 30 and bent cages 30 are repaired and/or straightned, the next step is to install new bags 35 on the cages 30. To install a new bag 35 a cage 30 is positioned over our manifold 100 and a slightly pressurize high volume air flow is provided through the manifold 100 to float the bag 35 onto the cage 30.

Figure 2:
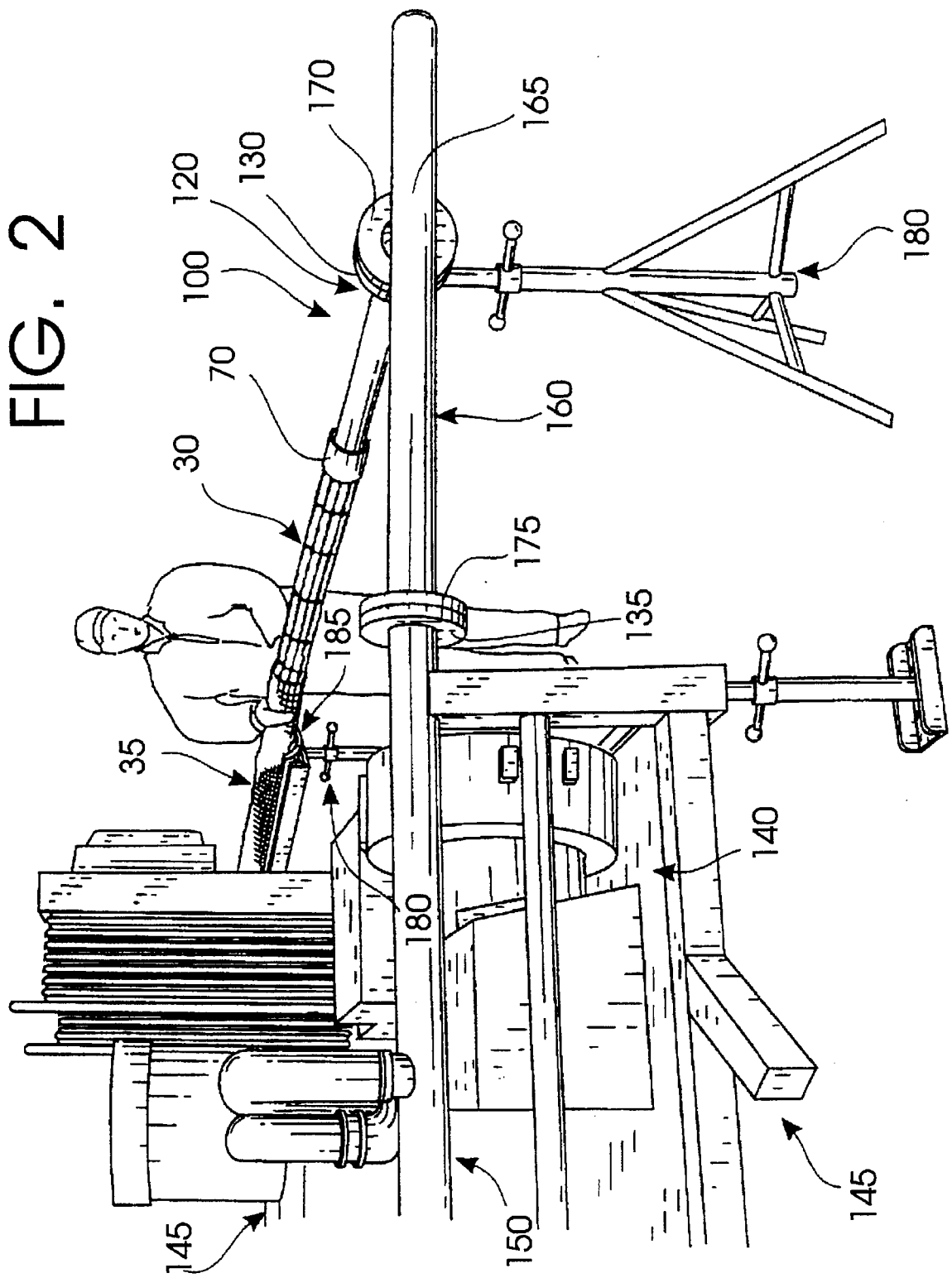
FIG. 2 is an isometric view illustrating use of our manifold for installation of a new bag on a baghouse cage; and, FIG. 3 is an enlarged isometric view illustrating initial installation of a new bag on a cage positioned on our manifold.
Figure 3:
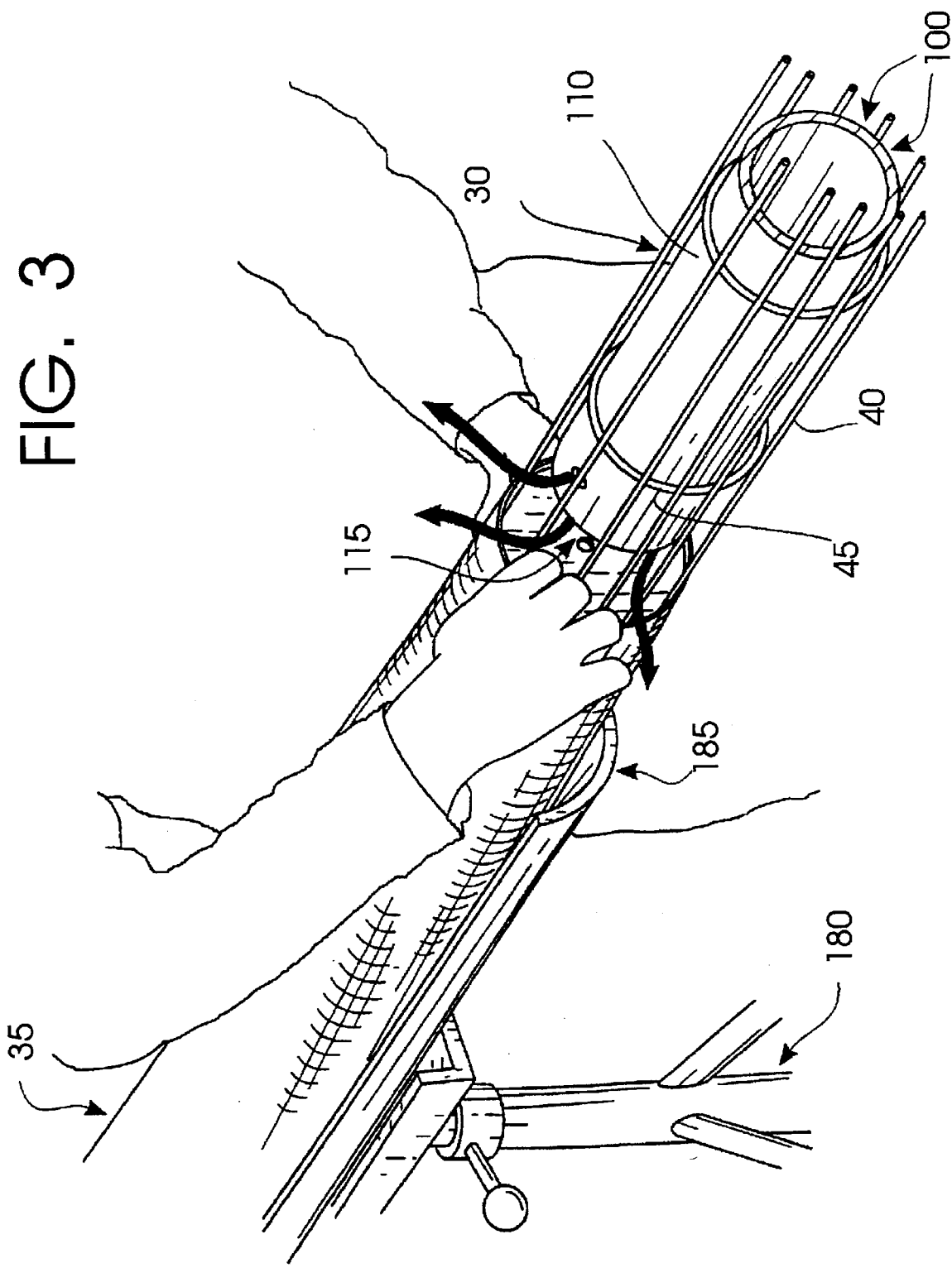

Our Baghouse Filter Installation Manifold 100 comprises an elongated, cylindrical, tubular body 110. The distal end 115 is open. The proximal end 120 comprises a flange 130 adapted to couple with a tuyere flange 135 to provide airflow communication with a compressor 140. Preferably, the compressor 140 is mounted to the front of a trailer 145 and supplies the pressurized air via a tuyere 150 spanning the front of the trailer 145. Flanges 135 are disposed on either end of the tuyere 150. If only one inflation manifold 100 is to be employed, a cap with a rubber seal is disposed over one of the tuyere flanges 135, sealing it. To facilitate use of the preferred trailer 145 a tuyere extension elbow 160 can be employed as illustrated in FIG. 2. The tuyere extension elbow 160 comprises a closed end tubular body 165 and two perpendicular flanges 170, 175. The input flange 175 is adapted to couple with the tuyere flange 135. The perpendicularly oriented output flange 170 is adapted to mate with the manifold flange 130, allowing the manifold 100 to be positioned generally parallel to the trailer 145. The manifold is supported near the flange 130 by a stand 180. A trough 185 is disposed in alignment with the open distal end 115 of the manifold 100 to support the new bag 35 to be installed.

To install a new bag 35 the cage 30 is positioned over our manifold 100. A slightly pressurize high volume air flow is provided through the manifold 100 by the compressor 140. As air is pumped through the manifold 100 the new bag 35 is slipped over the end of the cage 30. Once the bag 35 is inflated it is slid over the remaining portion of the cage 30. Inflation of the bag 35 reduces drag on the bag 35 caused by contact with the spines 40 of the cage 30 as it is installed. Preferably, the air used to inflate the bags 35 is warmer than ambient air, softening the bag 35 and making it more pliable.

Once the bag 35 is slid over the cage 30 it is appropriately anchored for the particular application. Then the rejuvenated cartridge 30 is remounted in the baghouse 10 in the appropriate manner.

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A baghouse filter installation manifold adapted to coaxially receive a baghouse cage for installing a new filter cartridge bag thereupon said manifold comprising:

an elongated, generally cylindrical, hollow body, pressurized with warm air;

an open distal end;

an open proximal end adapted to be mated to pressure means the providing slightly pressurized high volume air to inflate new bags fitted to said distal end, said proximal end comprising a flange for mating said manifold to Said pressure means:

radially spaced apart orifices defined in said body adjacent said distal end to maintain inflation of said bags during installation; and, a trough disposed generally parallel to and below said body, extending from said distal end.

2. A baghouse filter installation device for installing new baghouse filter cartridge bags upon baghouse cages said device comprising:

an elongated manifold pressurized with warm air having an open distal end adapted to coaxially receive a said baghouse cage said manifold comprising:

an elongated, generally cylindrical, hollow body;

radially spaced apart orifices defined in said body adjacent said distal end to maintain inflation of said bags during installation; and, an open proximal end adapted to be mated to pressure means for providing slightly pressurized high volume air to inflate new bags fitted to said distal end, said proximal end comprising a flange for mating said manifold to said pressure means: and, a trough generally parallel to and below said manifold, extending from said distal end of said manifold.

3. A baghouse filter bag installation system for installing new baghouse filter cartridge bags upon baghouse cages, said system comprising:

an elongated manifold adapted to coaxially receive a baghouse cage, said manifold comprising:

an elongated, generally cylindrical, hollow body;

an open distal end; and, an open proximal end comprising a flange;

compressor means for providing slightly pressurized high volume air said compressor means in fluid flow communication with said proximal end of said manifold to inflate new bags titled to said distal end; and, a tuyere to facilitate said fluid flow communication with said manifold and to facilitate providing fluid flow communication between said compressor means and a second manifold.

4. The system as defined in claim 3 wherein said tuyere comprises at least one flange to mate with said manifold proximal end flange to provide fluid flow communication between said compressor means and at least one of said manifolds.

5. The system as defined in claim 4 further comprising a cap to seal one of said tuyere flanges when not in use.

6. The system as defined in claim 5 further comprising a pliable seal disposed between said cap said tuyere flange to facilitate sealing one of said tuyere flanges when not in use.

7. The system as defined in claim 6 further comprising radially spaced apart orifices defined in said body adjacent said distal end to maintain inflation of said bags during installation.

8. The system as defined in claim 7 wherein said manifold is pressurized with warm air.

9. The system as defined in claim 8 further comprising a trough generally parallel to and below said manifold, extending from the distal end of said manifold.

10. The system as defined in claim 9 wherein said manifold body is disposed generally horizontally.

* * * * *